(12) United States Patent
Smithyman et al.

(10) Patent No.: US 11,881,602 B1
(45) Date of Patent: Jan. 23, 2024

(54) ELECTROCHEMICAL CELLS COMPRISING WATER-RETAINING COMPONENTS AND METHODS OF FABRICATING

(71) Applicant: CCL LABEL, INC., Framingham, MA (US)

(72) Inventors: Jesse Smithyman, Oakland, CA (US); Konstantin Tikhonov, Pleasanton, CA (US); Christine Ho, Fremont, CA (US); Chaojun Shi, Fremont, CA (US); Ehsan Faegh, Alameda, CA (US)

(73) Assignee: CCL LABEL, INC., Strongsville, OH (US)

( * ) Notice: Subject to any disclaimer, the term of this patent is extended or adjusted under 35 U.S.C. 154(b) by 0 days.

(21) Appl. No.: 17/356,845

(22) Filed: Jun. 24, 2021

Related U.S. Application Data

(60) Provisional application No. 63/043,969, filed on Jun. 25, 2020.

(51) Int. Cl.
*H01M 8/04291* (2016.01)

(52) U.S. Cl.
CPC .............................. *H01M 8/04291* (2013.01)

(58) Field of Classification Search
CPC ................................................ H01M 8/04291
See application file for complete search history.

(56) References Cited

U.S. PATENT DOCUMENTS

| 6,455,202 | B1 * | 9/2002 | Marugan | H01M 4/66 |
| | | | | 429/223 |
| 7,212,397 | B2 * | 5/2007 | Lang | C09D 11/02 |
| | | | | 29/25.03 |

(Continued)

OTHER PUBLICATIONS

Porous zirconium oxide nanotube modified Nafion composite membrane for polymer electrolyte membrane fuel cells operated under dry conditions; Keptang et al.(Year: 2015).*

(Continued)

*Primary Examiner* — Cynthia H Kelly
*Assistant Examiner* — Tarik J Phillip
(74) *Attorney, Agent, or Firm* — McDonald Hopkins LLC

(57) ABSTRACT

Provided are electrochemical cells, comprising water-retaining components, and methods of fabricating such electrochemical cells. A water-retaining component is configured to deliver water to the positive active material during the operation of the electrochemical cell. The water-retaining component may be a part of the positive active material layer, a part of the electrolyte layer, and/or a standalone component. In some examples, the water-retaining component comprises one or more crystal hydrates (e.g., $MgSO_4$, $MgCl_2$, $Na_2SO_4$, $Na_2HPO_4$, $CuSO_4$, $CaCl_2$, $KAl(SO_4)_2$, and $Mg(NO_3)_2$), one or more water-retaining polymers (e.g., sodium polyacrylate, potassium polyacrylate, ammonium polyacrylate, and a cellulose derivative), one or more inorganic compounds (e.g., fumed silica, precipitated silica). In some examples, a method of forming an electrochemical cell comprises printing a positive active material layer, a negative active material layer, and an electrolyte layer, e.g., printing the electrolyte layer directly over the positive active material layer or the negative active material layer.

20 Claims, 4 Drawing Sheets

(56) References Cited

U.S. PATENT DOCUMENTS

| | | | |
|---|---|---|---|
| 9,076,589 B2 | 7/2015 | Wright et al. | |
| 9,129,744 B2 * | 9/2015 | Hucker | H01M 10/0436 |
| 9,276,292 B1 | 3/2016 | Mackenzie et al. | |
| 10,784,540 B2 | 9/2020 | Shi et al. | |
| 2014/0059820 A1 * | 3/2014 | Wright | H01M 4/483 29/25.03 |
| 2016/0218390 A1 * | 7/2016 | Yamada | H01M 4/5825 |

OTHER PUBLICATIONS

Reducing crystallinity on thin film based CMC/PVA hybrid polymer for application as a host in polymer electrolytes M.A. Saadiaha,c,D. ZhangbY. NagaobS.K. Muzakirc (Year: 2019).*

Optical and Dielectric Properties of PVP Based Composite Polymer Electrolyte Films1 )S. K. Shahenoor Basha, G. Sunita Sundaria,K. Vijay Kumarb and M. C. Raoc, (Year: 2017).*

* cited by examiner

ELECTROCHEMICAL CELLS COMPRISING WATER-RETAINING COMPONENTS AND METHODS OF FABRICATING

CROSS-REFERENCE TO RELATED APPLICATIONS

This application claims the benefit under 35 U.S.C. § 119(e) of U.S. Provisional Patent Application 63/043,969, filed on 2020 Jun. 25, which is incorporated herein by reference in its entirety for all purposes.

BACKGROUND

Water management can be challenging in electrochemical cells, especially in large electrochemical cells. For example, water can be harmful to some components of a cell, while essential to the performance of other components.

What is needed are new methods and systems for water management in electrochemical cells.

SUMMARY

Provided are electrochemical cells, comprising water-retaining components, and methods of fabricating such electrochemical cells. A water-retaining component is configured to deliver water to the positive active material during the operation of the electrochemical cell. The water-retaining component may be a part of the positive active material layer, a part of the electrolyte layer, and/or a standalone component. In some examples, the water-retaining component comprises one or more crystal hydrates (e.g., $MgSO_4$, $MgCl_2$, $Na_2SO_4$, $Na_2HPO_4$, $CuSO_4$, $CaCl_2$, $KAl(SO_4)_2$, and $Mg(NO_3)_2$), one or more water-retaining polymers (e.g., sodium polyacrylate, potassium polyacrylate, ammonium polyacrylate, and a cellulose derivative), one or more inorganic compounds (e.g., fumed silica, precipitated silica). In some examples, a method of forming an electrochemical cell comprises printing a positive active material layer, a negative active material layer, and an electrolyte layer, e.g., printing the electrolyte layer directly over the positive active material layer or the negative active material layer.

DETAILED DESCRIPTION

Figure 1:
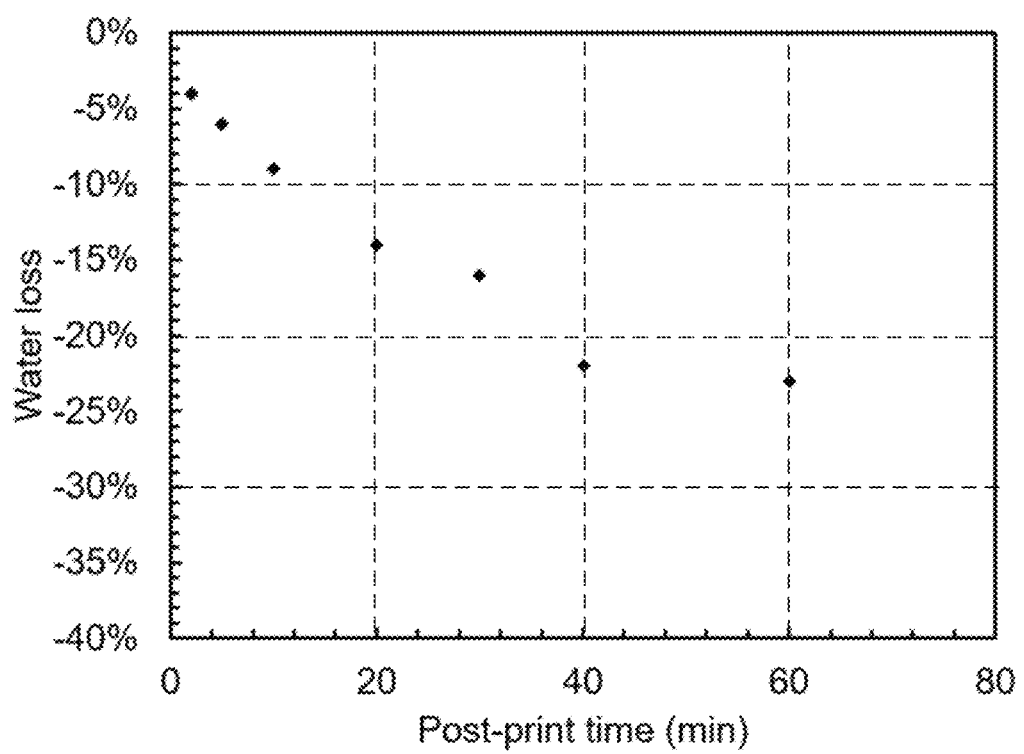
FIG. 1 is a plot of water losses from a printed electrolyte layer as a function of time.

In the following description, numerous specific details are set forth in order to provide a thorough understanding of the presented concepts. The presented concepts may be practiced without some or all of these specific details. In other instances, well-known process operations have not been described in detail to not unnecessarily obscure the described concepts. While some concepts will be described in conjunction with the specific examples, it will be understood that these examples are not intended to be limiting. On the contrary, it is intended to cover alternatives, modifications, and equivalents as may be included within the spirit and scope of the present disclosure as defined by the appended claims.

Various examples are described herein in the context of printable electrochemical cells with multivalent metal ions (e.g., $Zn^{2+}$) carrying the charge between the positive and negative electrodes. For purposes of this disclosure, the term "multivalent" is defined as an atomic or molecular species carrying more than one full charge. However, one having ordinary skill in the art will appreciate that some features described herein would apply to other types of electrochemical cells and/or other methods of manufacturing electrochemical cells. For example, electrochemical cells with monovalent metal ions carrying the charge may be similarly integrated into electronic circuits.

In this disclosure, the term "anode" refers to a negative electrode, which includes one or more negative active materials. The term "cathode" refers to a positive electrode, which includes one or more positive active materials. Various examples of negative active materials and positive active materials are described below.

"Ionic liquids" or, more specifically, "room temperature ionic liquids" are defined as a class of liquids that are organic salts and that have low melting points (e.g., below 100° C.). Ionic liquids have high ionic conductivities and low vapor pressures. Furthermore, ionic liquids tend to be electrochemically and thermally stable. Combining ionic liquids with certain polymers may be used to form electrolytes that have ion transport characteristics similar to conventional liquid electrolytes (e.g., solvent-based electrolytes) and much better ion transport characteristics than conventional polymer electrolytes or solid-state electrolytes. Furthermore, in some examples, electrolytes formed using ionic liquids are structurally robust and able to maintain the physical separation between positive and negative electrodes under compression and bending conditions, thereby eliminating the need for porous separators. Finally, in a typical ambient environment and at room temperature, electrolytes formed using ionic liquids do not dry out or "sweat" since the ionic liquids are negligibly volatile.

Scaling up the size of Zn-based electrochemical cells from small pouch cells to large wound/stacked assemblies presents at least two major challenges. The first challenge is managing gas generation (e.g., hydrogen generated on negative electrodes) and safe release of the generated gas into the environment. The second challenge is managing the amount of water in the cell during the cell fabrication as well as post-fabrication water ingress into the cell and also post-fabrication water egress from the cell (e.g., preventing the cells from drying out and losing water). For example, in small (single stack) cells, small amounts of generated gases are typically able to escape through the flexible packaging of these cells. However, in larger cells, generate gas amounts are a lot greater. Furthermore, generated gases may accumulate inside the rechargeable cells over many cycles. Various packaging requirements (e.g., hard cases) may also restrict the migration of generated gases through the packaging. At the same time, the accumulation of generated gases inside the cells may cause swelling, pressure buildup, leaking, and other undesirable effects.

Water management is another scale-up obstacle. Small and thin (such as single stack) cells initially absorb moisture, which manifests in a weight gain. Water absorption has a positive effect on cell performance. Specifically, while water is being absorbed during the initial few days after the cell fabrication, the cell experiences a drop in DC resistance (e.g., measured by applying 45 mA current for 0.4 sec).

Furthermore, it has been found that small (single stack) cells perform better and show higher rate capabilities and capacities in a humid environment due to the water ingress into the cells after the cell fabrication.

The following mechanisms illustrate the benefits of controllably adding water into Zn-based electrochemical cells. The first mechanism shows that the kinetics of the ionic transfer in the electrolyte is affected by water. Since the electrolyte comprises a zinc salt dissolved in an ionic liquid, the electrolyte may be very viscous. It has been found that adding 0.1% to 5% by weight of water substantially reduces the viscosity and results in higher ionic conductivity of the electrolyte. On one hand, the lower viscosity and higher ionic conductivity improve the kinetics and reduce the DC resistance of electrochemical cells. On the other hand, water induces the hydrogen gas evolution reaction (gassing), which highlights the importance of precise water management in the battery.

The second mechanism is the actual participation of water in electrochemical reactions. Formula 1 represents a reaction for cells using zinc chloride as a primary electrolyte:

$$Zn+2MnO_2+2H_2O+ZnCl_2 \rightarrow 2MnOOH+2Zn(OH)Cl \qquad \text{(Formula 1)}$$

Formula 2 represents a similar reaction for alkaline cells:

$$2MnO_2+Zn+2H_2O \rightarrow 2MnOOH+2Zn(OH)_2 \qquad \text{(Formula 2)}$$

As such, for alkaline and zinc-chloride cells, the molar amount of water is equal to the molar amount of $MnO_2$ or, based on weight, 87 grams of $MnO_2$ require 18 grams of water. In other words, the weight ratio of $MnO_2$ to water is about 5:1, or that the water should make up 20% by weight of the positive active material layer. At the same time, the water should be restricted to the positive active material layer and be kept away from the negative active material layer, which is hard to achieve in general. The problem becomes even more severe for larger cells as water tends to migrate through the batteries and can easily reach undesired locations.

Formula 3 represents the main summary reaction of intercalation of zinc into manganese dioxide:

$$xZn+yMnO_2 \rightarrow Zn_x(MnO_2)_y \qquad \text{(Formula 3)}$$

Without being restricted to any particular theory, it is believed that both reactions (e.g., intercalation of proton and intercalation of zinc) occur at the same time. Furthermore, it is believed that the co-intercalation of proton and zinc is faster than the zinc intercalation alone. Both reactions may proceed independently. For example, the proton intercalation (to form MnOOH) is a faster reaction. If water is present, this reaction is preferentially taking place.

Overall, water management is important in zinc cells, especially at high discharge rates. At the same, providing and keeping enough water at positive active material layers is challenging, especially if electrolyte layers are not water-based and/or water-free. The water-management challenge is even greater when various components of electrochemically active stacks (e.g., positive active material layers, electrolyte layers, negative active material layers) are printed. Printing operations involve drying the printed inks (e.g., to remove solvents and solidify printed layers). This post-printing drying also results in the removal of water from the printed layers. It should be noted that electrolyte layers are formed by printing rather than by the subsequent filling of electrolyte into a cell subassembly (e.g., introducing electrolyte into a porous separator prior to sealing electrochemical cells). In some example, an electrochemical cell is free from a porous separator and a printed electrolyte layer provide mechanical separation and electrical insulation between the positive and negative electrodes.

However, a printed electrolyte layer tends to lose water over time when exposed to ambient conditions (e.g., a temperature of 20-25° C. and relative humidity of 10-50%). FIG. 1 is a plot illustrating water losses as a function of time from one test sample of a printed electrolyte layer. This test sample was printed using a solution comprising zinc chloride, ammonium chloride, carboxymethyl cellulose, silica, and water. The amount of water was about 50-60% by weight in this solution. No specific drying operations (e.g., elevated temperatures, reduced pressures) were performed after printing. The electrolyte layer in its "as printed" form has been exposed to ambient conditions. As shown in FIG. 1, the water loss was almost 10% (of the total water in the printed electrolyte layer) after about 10 minutes of this ambient exposure and was almost 15% after about 20 minutes of the exposure. At such high water-loss rates, the battery performance can be impacted quite soon. As such, water control measures are particularly important in such cells.

In some examples, an electrolyte layer is not specifically dried after the printing operation. As such, the amount of water in the electrolyte layer may greater than 40% by weight, greater than 50% by weight, or even greater than 60% by weight (based on the total weight of the electrolyte layer). In some examples, an electrolyte layer comprises water in amount of 30% to 70% of the total weight of the electrolyte layer or, more specifically, 40% to 60%. In the same or other examples, such printed electrolyte layers (i.e., with significant amounts of water) have high ionic conductivity, e.g., above 40 mS/cm, above 50 mS/cm, or even above 60 mS/cm. One having ordinary skill in the art would appreciate that a higher electrolyte conductivity enables higher charge and discharge rates in batteries formed with these electrolyte layers.

In some examples, an electrolyte layer is screen printed or stencil printed. These printing techniques require an electrolyte solution (used to print the electrolyte layer) to be within a set viscosity range. For example, electrolyte solutions with low viscosities (e.g., less than 5 Pa·s at 10/s shear rate) are hard to control after printing. More specifically, printed electrolyte layers formed from such low-viscosity electrolyte solution tend to spread uncontrollably. On the other hand, when electrolyte solutions have high viscosities (e.g., greater than 100 Pa·s at 10/s shear rate), the printing process becomes challenging and often results in various printing defects, such as bare places, crater-like defects, non-uniform thicknesses, and the like. In some examples, the viscosity of the electrolyte solution at 10/s shear rate is from 10 Pa·s to 50 Pa·s or, more specifically, from 20 Pa·s to 40 Pa·s.

In some examples, an electrolyte layer is dried after printing. For example, the electrolyte layer is subjected to ambient conditions for 10-30 minutes. In more specific examples, the amount of water in the electrolyte layer is reduced by drying below the level provided in the printing solution (e.g., below 50% by weight) such as to 40% by weight or less or even to 30% by weight or less. Lower water content results in electrolyte layers that are more mechanically robust and, in some examples, have lower gassing. Overall, the lower water content improves battery shelf life, e.g., to more than 1 year.

Provided are methods and systems for water-management in large-scale electrochemical cells, which utilize water-retaining components, integrated into and/or positioned proximate to positive active material layers, and able to deliver water to various components of the positive active material layers during operation of the electrochemical cells. In some examples, one or more water-retaining components are parts of a positive active material layer.

In some examples, one or more water-retaining components are added to an electrolyte layer. Some examples of water-retaining components are water-retaining polymers (e.g., carboxymethyl cellulose (CMC), polyvinyl alcohol (PVA), or combinations thereof), hydroscopic salts (e.g., zinc chloride). Specifically, these water-retaining components can be used in electrolyte solution formulations to slow down printed electrolyte layers and before sealing these layers and, more specifically, before the battery sealing. In some examples, the amount of one or more polymeric water-retaining components in the electrolyte layer is from 1% by weight to 20% by weight or, more specifically, from 2% by weight to 10% by weight (based on the total weight of the electrolyte layer). In the same or other examples, the amount of one or more inorganic water-retaining components is from 10% by weight to 50% by weight or, more specifically, from 20% by weight to 40% by weight (based on the total weight of the electrolyte layer).

Various water-retaining materials and/or structures may be used for these water-retaining components. The water-retaining components retain water through the printing process and/or reabsorb water after the printing process. These water-retaining components prevent from forming pools of water (free-standing) on the surface of the printed layers (e.g., layer 146 in FIG. 2A) that can interfere with next printing steps or otherwise interfere with assembly, such as winding the jelly roll, putting together layers in a coin cell, staking a larger pouch or hard case battery, etc.

In some examples, drying of printed layers is performed at a temperature of between 65° and 85° C. and has a duration of between 20 minutes and 1 hour. A water-retaining component may comprise one or more polymers and/or one or more inorganic compounds, capable of retaining water during the drying operation. The printed and dried layers, comprising one or more water-retaining components, have mechanical characteristics similar to conventional printed and dried layers (e.g., hardness) yet contain substantial amounts of moisture. It should be noted that in addition or instead of water retention during the drying operation, one or more water-retaining components may obtain water after the drying operation, e.g., during a subsequent water-adding operation. The properties of the layer containing these one or more water-retaining components are retained during this water-adding operation.

Figure 2A:
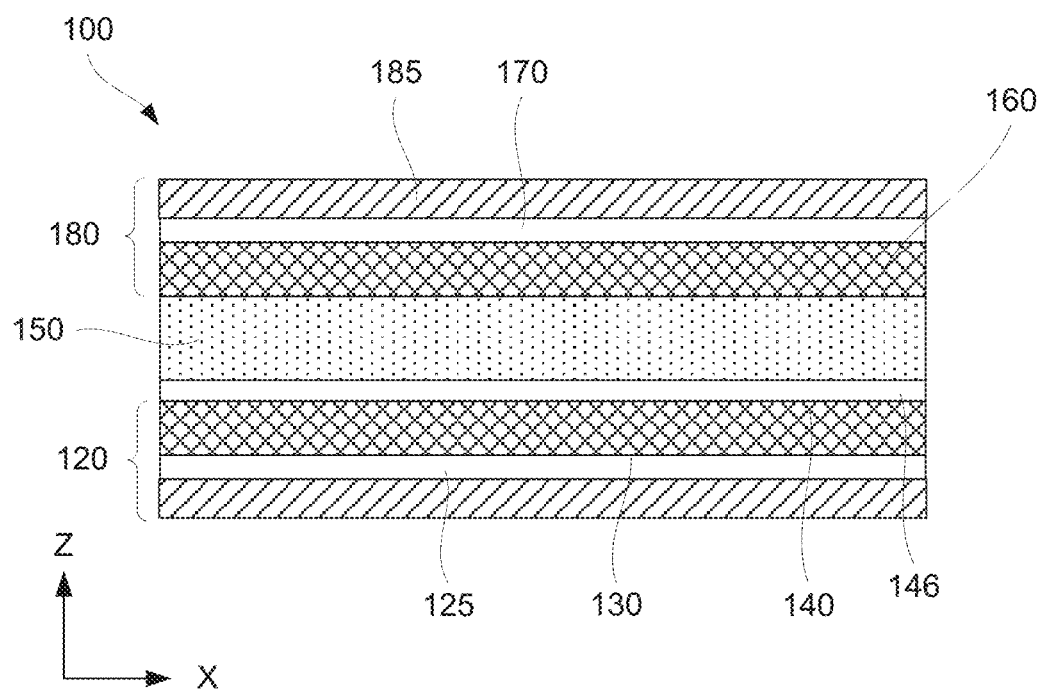
FIGS. 2A-2C are schematic views of an electrochemical cell comprising one or more water-retaining components, in accordance with some examples.

Referring to FIG. 2A, in some examples, one or more water-retaining components are parts of positive active material layer 140, electrolyte layer 150, negative active material layer 160, and/or an additional layer (e.g., a current collector, a polymer-ceramic coating on one or both active material layers). For example, FIG. 2A illustrates water-retaining layer 146 positioned over positive active material layer 140 and forming an interface between positive active material layer 140 and electrolyte layer 150. In the same or other examples, water-retaining layer 146 is positioned between positive active material layer 140 and positive current collector 125.

Since water is utilized in the reactions on a positive active material layer, one or more water-retaining components are either positioned in the positive active material layer or in a structure that allows migration of water from this structure to the positive active material layer (e.g., an electrolyte layer, a positive current collector, a positive interface layer).

In some examples, one or more water-retaining components are positioned in a structure, directly interfacing the positive active material layer.

In some examples, a water-retaining component comprises one or more crystal hydrates, e.g., $MgSO_4 \cdot 7H_2O$. Crystal hydrates can contain up to 50% of water by weight or even more. For example, $MgCl_2 \cdot 6H_2O$ contains 53% of water by weight. In some examples, hydrates, used for a water-retaining component, are not water-soluble and, therefore, cannot migrate from a positive active material layer to a negative active material layer with traces of moisture in the electrochemical cell. In some examples, crystal hydrates are free from Zn, K, and/or Na or, more specifically, free from Mg and/or Ca.

In some examples, hydrates of a water-retaining component do not lose all of the water at the drying temperature of up to 85° C. For example, $Na_2HPO4 \cdot 7H_2$ and many other hydrates only start losing water at above 100° C., i.e., the boiling point of water. Some hydrates may only partially lose water at drying temperatures. For example, $CuSO_4$ dehydrates from pentahydrate to tri-hydrate at 63° C. At 109° C. tri-hydrate of $CuSO_4$ is converted to a mono-hydrate and finally to an anhydrate at 200° C. $CuSO_4$ melts at 150° C. but does not decompose into ions until 650° C.

In some examples, a water-retaining component comprises calcium chloride, which may bind 6, 4, 2, 1, and/or 0 water molecules. The conversion from 6 water molecules to 4 molecules occurs at 30° C., from 4-2 at 45.5° C., from 2 water molecules to 1 molecule at 175° C., and finally to no water molecules at 260° C. As such, calcium chloride may be used in a form of $CaCl_2 \cdot 2H_2O$ between 45.5° C. to 175° C.

Other examples of suitable materials for a water-retaining component are presented in the table below. The table also lists the first dehydration step temperature for these materials.

| Hydrated Salt | $T_{dehydration}$ (° C.) |
|---|---|
| $CaCl_2 \cdot 6H_2O$ | 29-30 |
| $LiNO_3 \cdot 3H_2O$ | 30 |
| $Na_2CO_3 \cdot 10H_2O$ | 32 |
| $Na_2SO_4 \cdot 10H_2O$ | 32.4 |
| $CaBr_2 \cdot 6H_2O$ | 34 |
| $Na_2HPO_4 \cdot 12H_2O$ | 35-36 |
| $Mg(NO_3) \cdot 4H_2O$ | 47 |
| $Ca(NO_3) \cdot 4H_2O$ | 47 |
| $Na_2SiO_3 \cdot 4H_2O$ | 48 |

| Hydrated Salt | $T_{dehydration}$ (° C.) |
|---|---|
| $NaAl(SO_4)_2 \cdot 10H_2O$ | 61 |
| $Na_2B_4O_7 \cdot 10H_2O$ | 68 |
| $Na_2P_2O_7 \cdot 10H_2O$ | 70 |
| $Al(NO_3)_2 \cdot 9H_2O$ | 72 |
| $Ba(OH)_2 \cdot 8H_2O$ | 78 |
| $Mg(NO_3)_2 \cdot 6H_2O$ | 89-90 |
| $KAl(SO_4)_2 \cdot 12H_2O$ | 91 |
| $MgCl_2 \cdot 6H_2O$ | 117 |

Referring to the table above, the last three compounds ($Mg(NO_3)_2 \cdot 6H_2O$, $KAl(SO_4)_2 \cdot 12H_2O$, and $MgCl_2 \cdot 6H_2O$) have the first dehydration step temperature above 85° C., which makes them excellent candidates when drying temperatures reach that level. Furthermore, other hydrates (e.g., which lose water at low temperatures) may also be used. However, a rehydration operation may be used after drying, to reintroduce water. For example, a printed layer comprising one or more water-retaining components may be positioned into a humid environment for some time to allow for rehydration.

In some examples, a water-retaining component comprises one or more water-retaining polymers. For example, polyacrylates can retain water to up to 100× and more of their weights. Some specific examples include sodium polyacrylate, potassium polyacrylate, and ammonium polyacrylate. Other examples include cellulose derivatives such as xanthan, methylcellulose, and the like (or, more specifically, xanthan or methylcellulose). Some other examples include polyvinyl alcohol (PVA). One or more water-retaining polymers may be mixed into a slurry together with other components, e.g., to form a positive active material layer during printing-drying. Alternatively or in addition to the positive active material layer, one or more water-retaining polymers may be introduced into an electrolyte layer. Furthermore, one or more water-retaining polymers may be saturated with water before being used in the electrolyte layer and/or allowed to absorb water after the printing of one or more active material layers.

In some examples, a water-retaining component comprises one or more inorganic compounds, e.g., materials with high internal porosity such as fumed silica and/or precipitated silica. For example, precipitated silica can retain 5-7% of water by weight. A combination of one or more water-retaining polymers and one or more inorganic compounds may be used as well. Inorganic water-retaining compounds may be used to adjust the viscosity of electrolyte or positive electrode paste.

In some examples, one or more water-retaining components are mixed into a slurry together with other components (e.g., active materials, binder, carbon black, and/or solvent). The slurry is then printed and dried forming one of the components of the electrochemical cell, e.g., a positive active material layer. Without being restricted to any particular theory, it is believed that the water-retaining components are don't easily release water during processing (e.g., printing and drying). However, when manganese dioxide is involved in one or more electrochemical reactions, water-retaining components will release water molecules, thereby contributing water to the reactions.

In some examples, the total amount of water in electrochemical cell 100 is from 5% to 10% by weight or, more specifically, from 6% to 8% by weight based on the total weight of electrochemical cell 100 (which includes the weights of all active materials, current collectors, and packaging). This amount of water ensures high ionic conductivity between positive active material layer 140 and negative active material layer 160. In some examples, water is predominantly (more than 50% by weight) present in electrolyte layer 150. However, some amounts of water may be also present in one or both of positive active material layer 140 and negative active material layer 160.

Using printing techniques to form various battery components (e.g., positive active materials layers, electrolyte layers, and negative active material layers) provides unique opportunities for battery design and yields specific performance characteristics. For example, printing an active material layer on a current collector establishes a robust electromechanical connection between this active material layer and the current collector. Printing involves depositing a layer of ink onto a base, which may be a substrate or another printed layer. For purposes of this disclosure, the terms "ink", "paste" and "slurry" are used interchangeably. Depending on the type of a printed layer, the ink may contain a binder, one or more active material particles and, in some examples, conductive additive particles. Specifically, when an active material layer is printed on a current collector, the ink establishes very conformal contact with the surface of the current collector. This conformality provides strong adhesion between the binder and the surface when the ink is dried. Furthermore, active material particles and/or conductive additives in the ink can get closer to the surface of the current collector and better electrical connection in comparison, for example, to lamination of a preformed active material layer onto the current collector.

FIG. 2A is a schematic illustration of electrochemical cell 100, in accordance with some examples. Electrochemical cell 100 comprises positive electrode 120, negative electrode 180, and electrolyte layer 150, all of which may be collectively referred to as an internal component. Electrolyte layer 150 is disposed and provides ionic communication between positive electrode 120 and negative electrode 180. In some examples, electrolyte layer 150 comprises one or more fillers to provide physical or mechanical separation between positive electrode 120 and negative electrode 180. Some examples of fillers include but are not limited to silica, alumina, titania, and zinc oxide. The amount of fillers in electrolyte layer 150 may be between about 2% and 10% by weight or, more specifically, between 2% and 5% by weight (based on the total weight of electrolyte layer 150). In some examples, electrochemical cell 100 multiple positive electrodes and/or multiple negative electrodes, e.g., forming a stack of alternating positive and negative electrodes.

Positive electrode 120 comprises positive current collector 125 and positive active material layer 140. In some examples, positive active material layer 140 is printed over positive current collector 125. Alternatively, positive active material layer 140 is laminated to positive current collector 125 using a conductive pressure-sensitive adhesive layer. While the following description focuses on a conductive pressure-sensitive adhesive layer being a part of negative electrode 180, one having ordinary skills in the art would understand that a conductive pressure-sensitive adhesive layer may be also used in positive electrode 120.

In some examples, positive current collector 125 is a metal foil having a thickness of between 1 micrometer and 80 micrometers or, more specifically, between 5 micrometer and 30 micrometers. Other examples of positive current collector 125 include graphite foil, foil made from carbon nanotubes (with or without a binder), metal-plated fibers, metal foams (e.g., nickel foam or copper foam), screens and extended metal structures, grids, woven metal mesh, and the like. In the same or other examples, positive current collector 125 is formed from, or at least comprises, one or more of nickel, stainless steel, regular steel, titanium, and aluminum. In other examples, positive current collector 125 is a printed layer, comprising a polymer binder and a conductive additive. Some examples of suitable conductive additives include, but are not limited to, graphite, carbon black, graphene, and carbon nanotubes. This example of positive current collector 125 may be formed using inkjet printing, screen printing, stencil printing, flexographic printing, and/or slot die coating.

In thin printed batteries, the weight of the current collectors and the packaging contributes significantly to the total battery weight. In some examples, the weight ratio of all current collectors and all packaging of electrochemical cell 100 is from 20% to 70% or, more specifically, from 30% to 60% based on the total battery weight.

Figure 2B:
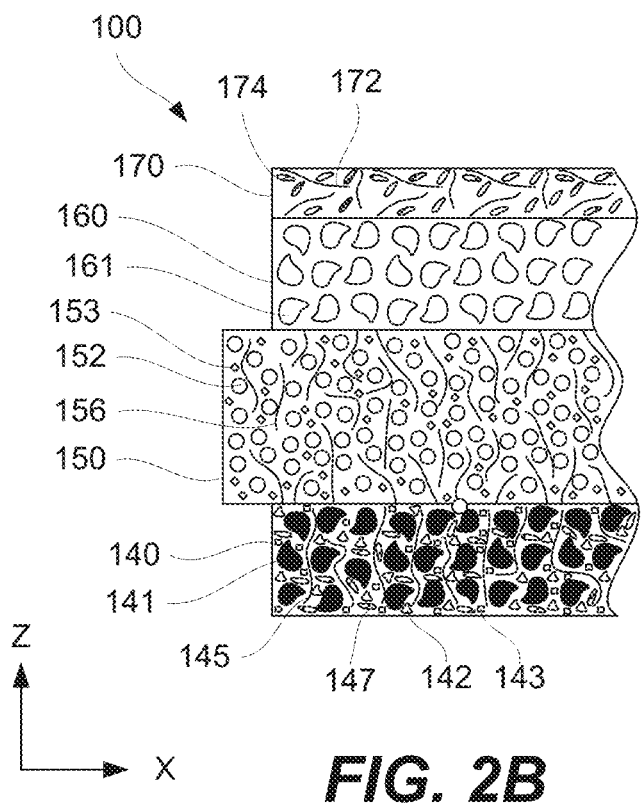

In some examples, positive active material layer 140 comprises positive active material 141 and positive layer binder 145 as schematically shown in FIG. 2B. In some examples, positive active material 141 comprises or consists essentially of a metal oxide or, more specifically, transition metal oxide (e.g., containing a metal from the 4th row of the Periodic Table of the Elements). Some examples of positive active material 141 include, but are not limited to, manganese oxide ($MnO_2$), silver oxide ($Ag_2O$), nickel oxide ($NiO_2$), nickel oxide hydroxide (NiOOH), vanadium oxide ($V_2O_5$), ferric phosphate ($FePO_4$), cobalt oxide ($COO_2$), lead oxide (PbO), and chromium oxide ($Cr_2O_3$). Positive active material 141 may be in the form of particles, having a mean particle size of between about 1 micrometer and 100 micrometers. In some examples, positive active material layer 140 comprises a combination of carbon and oxygen combination, e.g., when electrochemical cell 100 is a zinc-air battery.

In some examples, positive active material 141, such as manganese dioxide, has a particle size, from 6 micrometers to 100 micrometers or, more specifically, from 10 micrometers to 50 micrometers (average particle size). As such, the dry thickness of positive active material layer 140 (after printing and drying) may be from 40 micrometers to 400 micrometers or, more specifically, from 100 micrometers to 250 micrometers. In some examples, the weight ratio of positive active material 141 in positive active material layer 140 is from 70% to 98% or, more specifically, from 80% to 95%.

In some examples, the weight ratio of positive active material 141 is from 7% to 25% or, more specifically, 10% to 20% based on the total weight of the battery. In the same or other examples, the weight ratio of negative active material 161 is from 7% to 25% or, more specifically, 10% to 20% based on the total weight of the battery. In some examples, the total weight ratio of water and both positive active material 141 and negative active material 161 is less than 50% or even less than 30% based on the total weight of the battery.

In some examples, positive layer binder 145 is one of polyvinylidene difluoride (PVDF), polyvinyl alcohols (PVA or PVOH), acrylate, or a cellulose derivative. In some examples, the concentration of a binder is between 1% and 20% by weight, or more specifically between 2% and 5%. The selection of positive layer binder 145 is controlled, in part, by the ink deposition process, e.g., screen-printing.

In some examples, positive active material layer 140 further comprises conductive additive 147, as schematically shown in FIG. 2B. Some examples of conductive additive 147 include, but are not limited to, conductive carbons (e.g., carbon black, graphite, carbon nanotubes, graphene), or conductive nanoparticles (e.g., metal nanoparticles). The amount of conductive additive 147 may be between 0.01% and 30% by weight or, more specifically, between 2% and 5% for carbon black and graphite and/or between 0.01% and 2% for carbon nanotubes and graphene.

In some examples, positive active material layer 140 further comprises positive active layer ionic liquid 142, as schematically shown in FIG. 2B. When present, positive active layer ionic liquid 142 may be the same as or different from electrolyte ionic liquid 152, schematically shown in FIG. 2B and various examples of which are described below. In some examples, positive active layer ionic liquid 142 is 1-ethyl-3-methyl imidazolium bis(trifluoromethylsulfonyl) imide (EMIM TFSI), represented by the formula $C_8H_{11}F_6N_3O_4S_2$. In other examples, positive active layer ionic liquid 142 is 1-ethyl-3-propyl pyrrolidinium bis(trifluoromethylsulfonyl) imide. Positive active material layer 140 may be printed with positive active layer ionic liquid 142 already present in the printing ink. In these examples, electrolyte ionic liquid 152 does not need to migrate into positive active material layer 140. As such, positive active layer ionic liquids 142 may have uniform distribution (e.g., uniform concentration) throughout the thickness of positive active material layer 140. In general, a wide range of ionic liquids is applicable for Zn—$MnO_2$ type of electrochemical cell 100, such as ionic liquids electrochemically stable from about −0.8V to 1.3V versus hydrogen standard potential. Specific examples include, but are not limited to, imidazolium, pyrrolidinium, piperidinium, tetraalkyl ammonium ionic liquids with variety of anions: bis(trifluoromethane) sulfonimide (TFSO), trifluoromethylsulfonyl (TFS), bis (fluorosulfonyl)imide (FSI), tetrafluoroborate ($BF_4^-$), bis (oxalato)borate (BOB), and the like.

In some examples, positive active material layer 140 further comprises positive layer salt 143, as schematically shown in FIG. 2B. Positive layer salt 143 may be a zinc-containing salt, such as zinc(II) bis (trifluoromethanesulfonyl)imide (Zn-TFSI) represented by the following formula $Zn(C_2F_6NO_4S_2)_2$. Positive layer salt 143 may be introduced into positive active material layer 140 during printing of positive active material layer 140 on positive current collector 125. Other examples of positive layer salt 143 are Zn-containing and non-Zn-containing salts, such as zinc chloride ($ZnCl_2$), zinc fluoroborate ($Zn(BF_4)_2$), ammonium chloride ($NH_4Cl$), Ammonium tetrafluoroborate ($NH_4BF_4$), potassium hydroxide (KOH), sodium hydroxide (NaOH) and the like. In general, salts that are not moisture sensitive and do not react with moisture and oxygen may be used since such salts allow printing and drying positive active material layer 140 and subsequent layers in the ambient environment.

Also shown in FIG. 2A is positive interface layer 130, which is optional. When present, positive interface layer 130 is disposed between positive current collector 125 and positive active material layer 140. Positive interface layer 130 is used for adhesion, interface conductivity, and soaking up electrolyte components (e.g., operable as a reservoir). In some examples, positive interface layer 130 serves as a primer or adhesion-promoter between the binder of positive active material layer 140 and positive current collector 125. Enhanced helps with providing and maintaining the energy density of electrochemical cell 100. In some examples, positive active material layer 140 comprises less than 5% by weight of polymer binder allowing for more active materials in the layer. Such low amounts of the polymer binder are typically not sufficient for adhesion to positive current collector 125 when positive interface layer 130 is not used. Adding positive interface layer 130 allows decreasing the amount of polymer binder in positive active material layer 140 and increasing the amount of the active materials. Positive interface layer 130 may be a thin layer, which does not occupy a lot of space inside electrochemical cell 100. Unlike positive active material layer 140, positive interface layer 130 comprises much higher amounts of polymer binders, such as at least about 5% by weight (e.g., between about 5% and 30%) or at least about 10% by weight or even at least about 20%. Furthermore, in some examples, positive active material layer 140 may swell during its discharge and dry up as a result. Positive interface layer 130 may be operable as a reservoir for ionic conductors, i.e. salt and ionic liquid described above. In some examples, positive interface layer 130 is a carbon layer. Positive interface layer 130 may be printed over positive current collector 125 using ink comprising, e.g., carbon black, PVDF, and n-methyl-2-pyrrolidone (NMP). The thickness of positive interface layer 130 may be between 0.5 micrometers and 5 micrometers or, more specifically, between 1 micrometer and 2 micrometers.

Figure 2C:
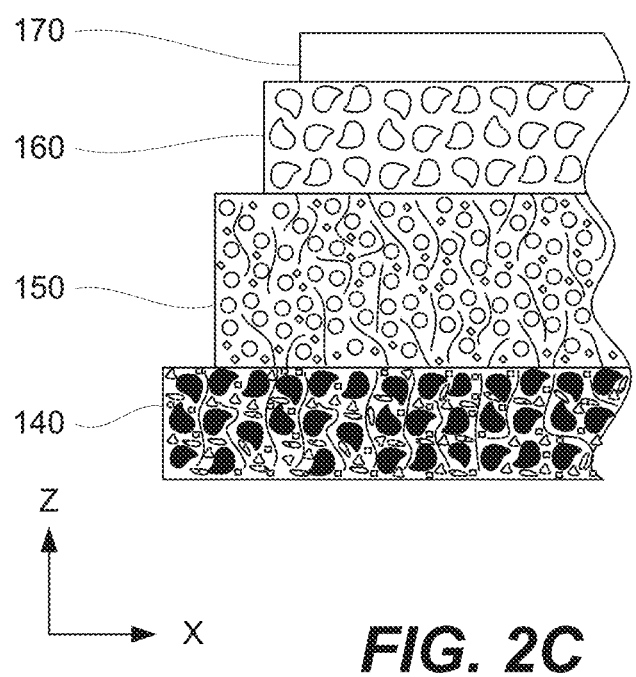

Referring to FIGS. 2A-2C, electrolyte layer 150 provides ionic communication between negative electrode 180 and positive electrode 120 or, more specifically, between negative active material layer 160 and positive active material layer 140. For example, electrolyte layer 150 facilitates transmission of multivalent ions, such as zinc, aluminum, magnesium and/or yttrium ions, between negative active material layer 160 and positive active material layer 140. Other types of ions are also within the scope.

In some examples, the wet thickness (as printed) of electrolyte layer 150 is from 50 micrometers to 250 micrometers or, more specifically, from 100 micrometers to 200 micrometers. After forming the stack, in which electrolyte layer 150 interfaces negative electrode 180 and positive electrode 120, some materials of electrolyte layer 150 are absorbed into the pores of positive active material layer 140 (of positive electrode 120) and the pores of negative active material layer 160 (negative electrode 180). As such, the thickness of electrolyte layer 150 in an operation cell is from 20 micrometers to 100 micrometers or, more specifically, between 30 micrometers to 80 micrometers. While a smaller thickness is desirable from the ionic transport perspective, a larger thickness ensures mechanical and electronic separation between negative electrode 180 and positive electrode 120.

Referring to FIG. 2B, in some examples, electrolyte layer 150 comprises electrolyte binder 156, electrolyte ionic liquid 152, and electrolyte salt 153. Electrolyte binder 156 mechanically supports other components in electrolyte layer 150 relative to each other. Furthermore, electrolyte binder 156 supports electrolyte layer 150 relative to other components, e.g., when electrolyte layer 150 is printed over negative active material layer 160 or over positive active material layer 140. Some examples of electrolyte binder 156 include, but are not limited to, polymers and copolymers of trifluoroethylene, tetrafluoroethylene, vinylidene chloride, vinylidene difluoride (difluoroethylene), hexafluoropropylene, styrene, butadiene, ethylene oxides, acrylate and/or methacrylate esters, variations and rubbers thereof, and so forth, as well as polyesters, polyanilines, polyethers, polyimides, copolymers and blends thereof, so forth. The polymer may be linear, branched, or cross-linked. More specific examples include poly(vinylidene fluoride) (PVDF), poly (vinylidene fluoride-hexafluoropropylene) (PVDF-HFP), polyvinyl alcohol (PVA), poly(ethylene oxide) (PEO), poly (acrylo-nitrile) (PAN), and poly(methyl methacrylate) (PMMA), epoxy derivatives, and silicone derivatives.

Electrolyte ionic liquid 152 enhances ionic conductivity of electrolyte layer 150. In some examples, the ionic conductivity of electrolyte layer 150 is between 2.3 mS/cm and 2.7 mS/cm. As noted above, the ionic conductivity of electrolyte layer 150 depends, at least in part, on the amount of water in electrolyte layer 150. In some examples, the weight ratio of water in electrolyte layer 150 is from 30% to 70% or, more specifically, from 40 to 60%.

Electrolyte ionic liquid 152 comprises anions and cations, which, in some examples, are organic cations or inorganic cations. Some examples of these organic cations are imidazolium, pyrrolidinium, ammonium, pyridinium, piperidinium, phosphonium, sulfonium, and tetraalkyl ammonium. Some examples of inorganic cations include, but are not limited to, Li, Zn, Na, Al, Mn, Mg, and Y (yttrium) ions. Examples of anions include, but are not limited to, organosulfonate (e.g., methanesulfonate [mesylate], trifluoromethanesulfonate [triflate], toluenesulfonate [tosylate], so forth), organosulfimide (e.g., bis((methyl)sulfonyl)imide [mesylate sulfimide, or MSI]), bis(trifluoromethylsulfonyl)-imide [TFSI]), sulfate, phosphate, organophosphate, organoborate (e.g., trialkyl borate, chelated organoborate, bis(oxalo)borate, so forth), tetrachloroborate, aluminate, dicyanamide, carboxylate (e.g., formate, acetate), perchlorate, nitrate and halide (e.g., chloride, bromide, iodide). Additional anions examples include 1-butyl-3-methylimidazolium perchlorate, 1-butyl-3-methylimidazolium hydroxide, 1-butyl-3-methylimidazolium trifluoromethanesulfonate, 1-butyl-3-methylimidazolium methanesulfonate, 1-butyl-2,3-dimethylimidazolium methanesulfonate, 1-butyl-2,3-dimethylimidazolium trifluoromethanesulfonate, 1-butyl-1-methylpyrrolidinium methanesulfonate, 1-butyl-1-methylpyridinium methanesulfonate, 1-butyl-1-methylpyridinium trifluoromethanesulfonate, 1-ethyl-1-methyl-pyrrolidinium methanesulfonate, 1-ethyl-1-methylpyrrolidinium trifluoromethanesulfonate, 1-methyl-1-propyl-pyrrolidinium methanesulfonate, 1-ethyl-1-methylpyrrolidinium trifluoromethanesulfonate, 1-ethyl-3-methylimidazolium (EMIM) methanesulfonate, 1-ethyl-3-methyl-imidazolium (EMIM) hydroxide, 1-ethyl-3-methylimidazolium (EMIM) trifluoromethanesulfonate, 1-butyl-3-methylimidazolium (BMIM) formate, 1-butyl-2,3-dimethylimidazolium formate, 1-butyl-1-methylpyrrolidinium formate, 1-butyl-3-methylimidazolium acetate, 1-butyl-1-methylpyrrolidinium acetate, 1-butyl-1-methylpyrrolidinium trifluoromethanesulfonate, 1-butyl-1-methylpyrrolidinium tetrachloroborate, 1-butyl-1-methylpyridinium tetrachloroborate, 1-ethyl-1-methylpyrrolidinium tetrachloroborate, 1-ethyl-3-methylimidazolium tetrachloroborate, 1-ethyl-1-methylpyrrolidinium trifluoromethanesulfonate, 1-methyl-1-propylpyrrolidinium tetrachloroborate, 1-methyl-1-propylpyrrolidinium trifluoromethanesulfonate, 1-butyl-3-methylimidazolium propionate, 1-butyl-1-methylpyrrolidinium propionate, 1-butyl-3-methylimidazolium tetraphenylborate, 1-butyl-3-methylimidazolium bis(fluorosulfonyl)imide, 1-butyl-3-methylimid-azolium bis(trifluoromethane)sulfonimide, 1-butyl-2,3-dimethyl-imidazolium tetraphenylborate, 1-butyl-2,3-dimethyllimidazolium bis(fluorosulfonyl)imide, 1-butyl-2,3-dimethylimidazolium bis(trifluoromethane) sulfonimide, 1-butyl-3-methylimidazolium bis(methylsulfonyl)imide, 1-butyl-2,3-dimethyllimidazolium bis((methyl) sulfonyl)imide, 1-butyl-3-methylimidazolium bis-((methyl) sulfonyl)amide, 1-butyl-1-methylpyrrolidinium bis ((methyl)sulfonyl)imide, 1-butyl-1-methylpyrrolidinium bis (fluorosulfonyl)imide, 1-butyl-1-methyl-pyrrolidinium bis (trifluoro-methane)sulfonimide, 1-butyl-1-methylpyridinium bis(methylsulfonyl)imide, 1-ethyl-1-methyl-pyrrolidinium bis(methylsulfonyl)imide, 1-ethyl-1-methyl-pyrrolidinium bis(fluorosulfonyl)-imide, 1-ethyl-1-methyl-pyrrolidinium bis(trifluoromethane)sulfonimide, 1-ethyl-3-methylimid-azolium bis(methylsulfonyl)imide, 1-ethyl-3-methylimid-azolium bis(fluorosulfonyl)imide, 1-ethyl-3-methyl-imidazolium (EMIM) bis(trifluoromethane)-sulfonimide, 1-methyl-1-propyl-pyrrolidinium bis((methyl)sulfonyl)imide, 1-methyl-1-propylpyrrolidinium bis (fluorosulfonyl)-imide, 1-methyl-1-propylpyrrolidinium bis (trifluoromethane)sulfonimide, 1-butyl-2,3-dimethyl-imidazolium bis((methyl)sulfonyl)amide, 1-butyl-2,3-dimethylimidazolium bis(fluorosulfonyl)-imide, 1-butyl-2, 3-dimethylimidazolium bis(trifluoromethane)sulfonimide, 1-butyl-1-methyl-pyrrolidinium bis((methyl)sulfonyl) amide, 1-butyl-1-methylpyridinium bis(methyl sulfonyl)-amide, 1-butyl-1-methylpyrrolidinium bis(fluorosulfonyl) imide, 1-butyl-1-methylpyrrolidinium bis(trifluoromethane)

sulfonimide, 1-ethyl-1-methylpyrrolidinium bis(methylsulfonyl)amide, 1-ethyl-3-methylimidazolium bis((methyl)sulfonyl)amide, 1-ethyl-1-methylpyrrolidinium bis-(fluorosulfonyl)imide, 1-ethyl-1-methylpyrrolidinium bis-(trifluoromethane)sulfonimide, 1-methyl-1-propylpyrrolidinium bis(methyl sulfonyl)amide, 1-methyl-1-propylpyrrolidinium bis(fluorosulfonyl)imide, 1-methyl-1-propylpyrrolidinium bis(trifluoromethane)sulfonimide, 1-butyl-3-methylimidazolium propionate, and 1-butyl-1-methylpyrrolidinium propionate. One specific example of electrolyte ionic liquid 152 is 1-butyl-3-methylimidazolium trifluoromethanesulfonate [$C_9H_{15}F_3N_2O_3S$]. Overall, ionic liquids, which are electrochemically stable in the operating voltage range of zinc and manganese dioxide electrodes may be used. Furthermore, ionic liquids that do not react with moisture and oxygen may be used allowing to perform deposition processes (e.g., printing) in the ambient environment.

In some examples, electrolyte ionic liquid 152 is the same as positive active layer ionic liquid 142. Alternatively, electrolyte ionic liquid 152 is different from positive active layer ionic liquid 142. In some examples, electrolyte ionic liquid 152 is hydroscopic.

Electrolyte salt 153 is an ionic source within electrolyte layer 150. Positive layer salt 143 is another ionic source in the overall system. Electrolyte salt 153 may be uniformly distributed throughout electrolyte layer 150, at least during fabrication of electrolyte layer 150.

In some examples, electrolyte salt 153 comprises multivalent metal ions, such as zinc, aluminum, magnesium, and/or yttrium ions. In some examples, the anion of electrolyte salt 153 is identical or chemically similar to the anion of electrolyte ionic liquid 152. Some examples of such anions include, but are not limited to, chlorides, sulfates, tetrafluoroborate ($BF_4^-$), trifluoroacetate ($CF_3CO_2^-$), trifluoromethansulfonate ($CF_3SO_3^-$), hexafluorophosphate ($PF_6^-$), bis(trifluoromethylsulfonyl)amide ($NTf_2^-$), and bis(fluorosulfonyl)imide ($N(SO_2F)^2$). One specific example of a salt is zinc trifluoromethanesulfonate [$Zn(CF_3SO_3)_2$].

The solubility limit of electrolyte salt 153 within electrolyte ionic liquid 152 is defined as the concentration of electrolyte salt 153 added to electrolyte ionic liquid 152 at which no more electrolyte salt 153 can be dissolved. In some examples, the concentration of electrolyte salt 153 is between 25% and 100% of its solubility limit or, more specifically, between 50% and 95% of its solubility limit, such as between 60% and 88% of its solubility limit. In some examples, the concentration of electrolyte salt 153 in electrolyte layer 150 is 0.1 M to 5 M or, more specifically, between about 0.5M and 2M, between 0.4 and 0.75 M, or even between 0.45 and 0.65 M.

Referring to FIG. 2A, negative electrode 180 comprises negative current collector 185, negative active material layer 160, and conductive pressure-sensitive adhesive layer 170. Conductive pressure-sensitive adhesive layer 170 is disposed between and directly interfacing negative current collector 185 and negative active material layer 160. Furthermore, conductive pressure-sensitive adhesive layer 170 mechanically supports negative current collector 185 and negative active material layer 160 relative to each other and provides electronic conductivity between negative current collector 185 and negative active material layer 160 as further described below.

In some examples, negative current collector 185 is a metal foil or a metal screen having a thickness of between 1 micrometer and 80 micrometers or, more specifically, between 5 micrometers and 30 micrometers. Thinner structures provide more flexibility, but less structural integrity and electronic conductivity. In some examples, negative current collector 185 is formed from, or at least comprises, one or more of copper (e.g., copper alloy), brass, steel or stainless steel, copper, and zinc. In other examples, negative current collector 185 is a printed layer, comprising a polymer binder and a conductive additive. Some examples of the conductive additive used for a printed example of negative current collector 185 include, but are not limited to, silver, brass, indium, carbon, nickel, and copper. An example of negative current collector 185 may be formed using inkjet printing, screen printing, stencil printing, flexographic printing, and/or slot die coating. The thickness of negative current collector 185 in the printed or deposited form may be controlled or adjusted by the printing/deposition processes.

In some examples, negative active material layer 160 is printed over electrolyte layer 150. However, other methods of forming negative active material layer 160 are also within the scope. Negative active material layer 160 comprises negative active material 161. In some examples, negative active material layer 160 comprises one or more other components, besides negative active material 161. Alternatively, negative active material layer 160 consists essentially (e.g., at least 95% by weight or even at least 99% by weight) negative active material 161. One example of negative active material 161 is an elemental metal. The elemental metal may be one providing monovalent ions (e.g., $Li^+$, $Na^+$, $Cu^+$) or polyvalent ions (e.g., $Zn^{2+}$, $Ni^{2+}$, $Al^{3+}Ga^{3+}$, $Co^{3+}$, $Ca^{2+}$, $Mg^{2+}$, so forth).

It should be noted that the particle size of the zinc powder puts particular limits on the thickness of negative active material layer 160, especially during printing of negative active material layer 160. In some examples, the particle size of zinc powder is from 20 micrometers to 100 micrometers average particle size. Therefore, the wet thickness of negative active material layer 160 is at least 100 micrometers to ensure that printing is performed without streaks or other like defects. The dry thickness of negative active material layer 160 from 80 micrometers to 250 micrometers or, more specifically, from 100 micrometers to 200 micrometers. In some examples, negative active material 161 represents between 70% by weight to 90% by weight or, more specifically, between 80% by weight to 95% by weight of negative active material layer 160 (after drying).

In some examples, negative active material layer 160 is operable to emit multivalent ions when undergoing an oxidation reaction. For example, zinc metal forms zinc ions of divalent charge ($Zn^{2+}$). In some examples, negative active material layer 160 comprises structures having multiple different morphological features (e.g., zinc flakes and spherical particles and nanoparticles) to increase electrode capacity and rate of discharge.

Negative active material layer 160 may also comprise a polymer, and in some cases, a polymer and a conductive additive. The conductive additive may be a carbon material (e.g., carbon black, graphite, nanotubes, graphene) or a metal. For example, metals with low overvoltage of hydrogen evolution may be used to minimize side reactions. Some examples include indium, bismuth, brass, lead, and mercury. In some examples, negative active material layer 160 comprises a gelling agent, such as xanthan gum, CMC, gelatin, cellulose derivatives.

Referring to FIG. 2A, conductive pressure-sensitive adhesive layer 170 provides an electro-mechanical connection between negative current collector 185 and negative active material layer 160. A combination of conductive pressure-sensitive adhesive layer 170 and negative current collector 185 may be supplied as a negative current collector assembly. For example, negative current collector 185 may be a metal foil or metal mesh. Conductive pressure-sensitive adhesive layer 170 printed over negative current collector 185.

It should be noted that, in some examples, when negative current collector 185 is connected to negative active material layer 160, both conductive pressure-sensitive adhesive layer 170 and negative active material layer 160 are already formed. In other words, printing may not be involved in forming an interface between conductive pressure-sensitive adhesive layer 170 and negative active material layer 160. Instead, this interface is formed by laminating a negative current collector assembly over negative active material layer 160. Characteristics of conductive pressure-sensitive adhesive layer 170 are specifically selected to provide an electro-mechanical connection between negative current collector 185 and negative active material layer 160 and complete laminating without damaging other components of electrochemical cell 100 already connected to negative active material layer 160. As noted above, in some examples, negative active material layer 160 has been already printed over electrolyte layer 150, which in turn has been printed over positive active material layer 140, which in turn has been printed over positive current collector 125.

In some examples, conductive pressure-sensitive adhesive layer 170 comprises polymer base 172 and conductive filler 174. Some examples of polymer base 172 include, but are not limited to, an acrylic polymer, isobutylene (e.g., polyisobutylene (PIB)) and other hydrocarbons, or silicones. These materials allow lamination to negative active material layer 160 at low temperatures, e.g., less than 80° C., thereby preserving the integrity of other previously formed components of electrochemical cell 100, such as negative active material layer 160, electrolyte layer 150, and positive active material layer 140, which may be temperature sensitive. Furthermore, these materials provide good adhesion to negative active material layer 160 and maintain this adhesion during the operating lifetime of electrochemical cell 100. Finally, conductive pressure-sensitive adhesive layer 170 is not exposed to any solvents when ionic liquids are used in electrolyte layer 150 and other layers of electrochemical cell 100. This "solvent-free" feature allows using the above-referenced examples of polymer base 172, which are otherwise not suitable for conventional electrochemical cells.

Some examples of conductive filler 174 include, but are not limited to, metal particles, carbon-based particles, and the like. Some examples of metal particles include, but are not limited to, nickel particles, copper particles, indium particles, bismuth, brass, and silver particles. The particle size of conductive filler 174 of conductive pressure-sensitive adhesive layer 170 may be between 1 micrometer and 100 micrometers or, more specifically, between 1 micrometer and 35 micrometers. It should be noted that the particle size is a secondary particle size and refers to lengths of particles when high aspect ratio (greater than 3 or 5) particles are used. The size of conductive particles should not exceed the thickness of conductive pressure-sensitive adhesive layer 170, unless the conductive particles have a high aspect ratio, as in carbon nanotubes, graphene, silver wires.

The concentration of conductive filler 174 in conductive pressure-sensitive adhesive layer 170 is less than about 60% by volume or, more specifically, less than about 30% by volume. At such low concentrations of conductive filler 174, the particles of conductive filler 174 are encapsulated by polymer base 172, further electrochemically isolating conductive filler 174 from the environment and, especially, from electrolyte layer 150.

In some examples, the thickness of conductive pressure-sensitive adhesive layer 170 is between about 1 micrometer and 100 micrometers or, more specifically, between about 5 micrometers and 25 micrometers. At such low thicknesses, the conductivity of conductive pressure-sensitive adhesive layer 170 may be relatively low while still providing sufficient electronic conductivity between negative current collector 185 and negative active material layer 160. For example, the current density through conductive pressure-sensitive adhesive layer 170 may be between 0.01 mA/cm$^2$ and 100 mA/cm$^2$ or, more specifically, between 1 mA/cm$^2$ and 10 mA/cm$^2$, during a typical operation of electrochemical cell 100.

Figure 3:
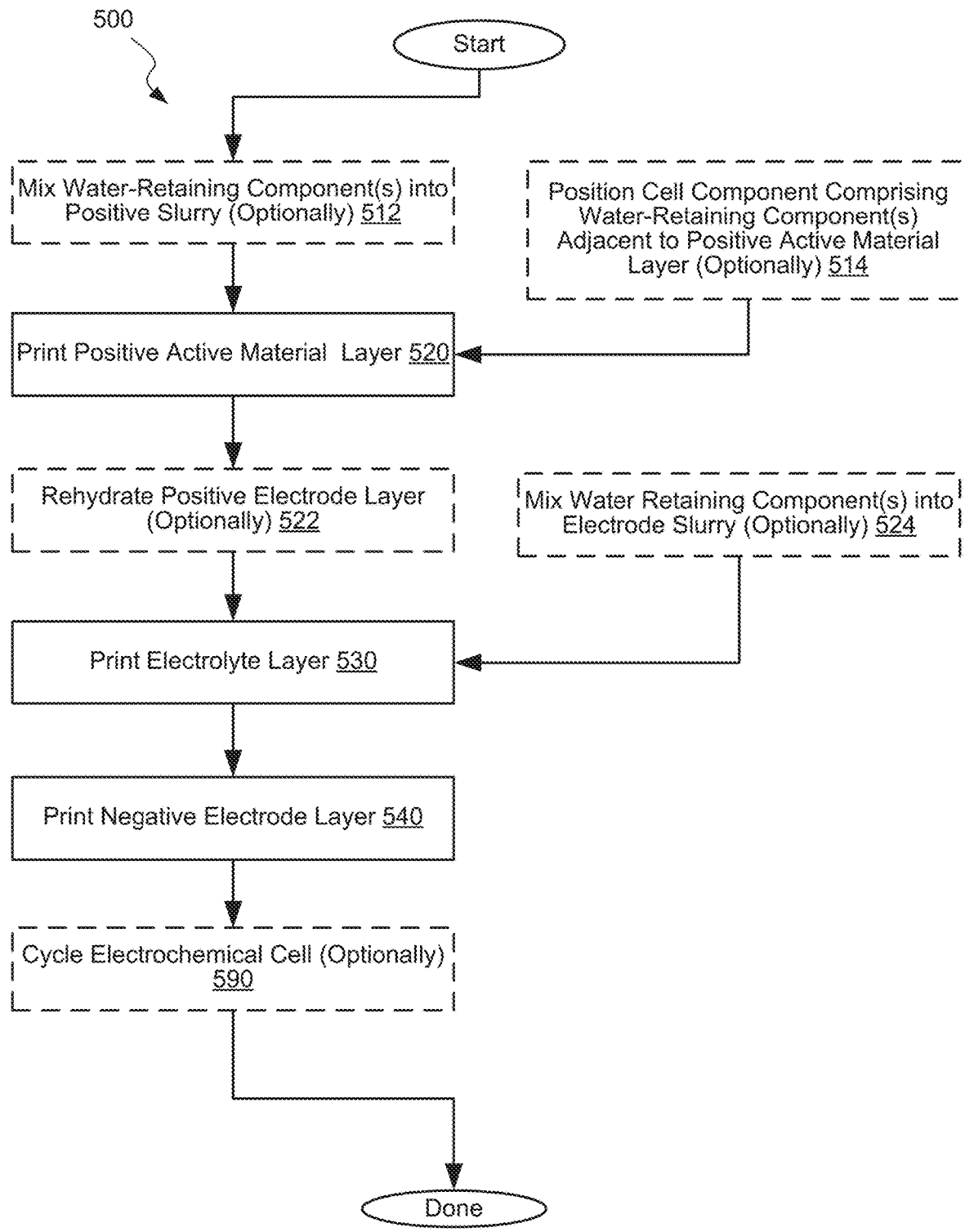
FIG. 3 is a process flowchart corresponding to a method of fabricating an electrochemical cell comprising one or more water-retaining components, in accordance with some examples.

FIG. 3 is a processing flowchart corresponding to method 500 of fabricating electrochemical cell 100, in accordance with some examples. STOP HERE In some examples, method 500 comprises mixing (block 512) a water-retaining component into a positive slurry, which also comprises positive active material 141. This is an optional operation, and other methods of introducing a water-retaining component into electrochemical cell 100 are also within the scope.

Method 500 involves printing positive active material layer 140 over positive current collector 125 (block 520). In some examples, positive active material layer 140 and/or other layers described below are printed using one or more of the following techniques: direct-write printing, screen printing (e.g. Atma, M&R, Colt), flexographic printing (Dai's Machinery, Line O Matic), gravure printing, dispenser printing, inkjet printing (e.g., FUJIFILM Dimatix), and slot die coating.

Direct write dispenser printing comprises a method for additively depositing a variety of materials, including slurries, solutions, and suspensions, generally referred to as "inks." Direct write dispenser printing is a flow-based method of direct-write patterning with the ability to deposit inks at room temperature and ambient conditions, all the while generating negligible material waste and requiring minimal environmental overhead. In comparison to conventional microfabrication techniques, which utilize subtractive processes such as lithography and etching, the number of process steps, energy demanded, and waste generated is significantly less.

In one arrangement, printable materials for electrodes are slurries of active electrode material particles mixed with a polymer binder(s), a removable solvent, and optional additives. In one example, cathode chemistries may comprise a metal oxide such as vanadium pentoxide particles, manganese dioxide particles, or both kinds of particles as the active cathode material particles. In one example, the anode chemistries have zinc particles as the active anode material particles.

After the ink deposition, the ink is dried. In some examples, the drying is performed at room temperature for about 1-15 minutes and then at a temperature of 60°-90° C. for about 3-30 minutes. A vacuum oven, an infrared lamp, and/or a heat lamp may be used for drying. The drying process removes one or more solvents from the deposited ink thus leaving a solid layer, which is referred to as positive active material layer 140. After all layers are printed, the entire printed stack may be dried to remove any residual evaporative solvents.

In some examples, method 500 comprises positioning a cell component comprising a water-retaining component adjacent to positive active material layer 140 (block 514). Various examples of this cell component (and also examples of the water-retaining component) are described above. This is an optional operation, and a water-retaining component may be introduced directly into one or more components of electrochemical cell 100.

In some examples, method 500 comprises rehydrating positive active material layer 140 (block 522). For example, positive active material layer 140 may be placed into a high-humidity environment to drive water into positive active material layer 140. This is an optional operation, and water may be introduced into positive active material layer 140 by other means (e.g., directly into the slurry used to print positive active material layer 140).

In some examples, method 500 comprises mixing a water-retaining component into an electrolyte slurry (block 524). As described below, the electrolyte slurry is used for printing of electrolyte layer 150. Specifically, the water-retaining component may be mixed with other components, such as an electrolyte salt and an electrolyte solvent. This is an optional operation, and water may be introduced into electrochemical cell 100 using other means.

Method 500 proceeds with printing of electrolyte layer 150 over positive active material layer 140 (block 530). The printing process is similar to the printing of positive active material layer 140 described above. The printing of electrolyte layer 150 may involve a screen or a stencil with a larger print pattern than the footprint of positive active material layer 140. As such, electrolyte layer 150 fully overlaps with positive active material layer 140 and covers positive active material layer 140 in its entirety. In some examples, electrolyte layer 150 is printed in stages, e.g., by printing several sub-layers over each other, e.g., 2 to 5 sublayers. This stage printing aspect may be used to reduce printing defects (e.g., voids) that propagate through the entire thickness of electrolyte layer 150.

Method 500 proceeds with printing negative active material layer 160 over electrolyte layer 150 (block 540). The printing process is similar to the printing of positive active material layer 140 described above. The printing of negative active material layer 160 typically involves a screen with a smaller print pattern than the footprint of electrolyte layer 150.

Different printing techniques used for printing positive active material layer 140, electrolyte layer 150, negative active material layer 160 may result in the different alignment of these components. For example, FIG. 2B illustrates edges of positive active material layer 140, electrolyte layer 150, and negative active material layer 160 printed using screen printing. FIG. 2C illustrates edges of positive active material layer 140, electrolyte layer 150, and negative active material layer 160 printed using stencil printing. During stencil printing, the edge alignment may be similar to a pyramid due to the stencil size used for printing electrolyte layer 150 being larger than the stencil for positive active material layer 140.

It is appreciated that not all internal components of electrochemical cell 100 are printed. For example, a negative current collector assembly may be provided as a pre-formed solid component. In some examples, a pre-formed zinc foil is used instead of printing negative active material layer 160.

Method 500 proceeds with cycling electrochemical cell 100 (block 590). In some examples, this cycling causes redistribution of water within electrochemical cell 100, e.g., water transfer from electrolyte layer 150 to positive active material layer 140. Overall, the water-retaining component delivers water to positive active material 141 of positive active material layer 140 during the operation of electrochemical cell 100.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present examples are to be considered as illustrative and not restrictive.

What is claimed is:

1. A method of forming an electrochemical cell, the method comprising:
    printing a positive active material layer comprising a positive active material;
    providing a pre-formed zinc foil as a negative active material layer; and
    printing an electrolyte layer,
        wherein the electrolyte layer is disposed between and providing ionic communication between the positive active material layer and the negative active material layer, and
        wherein the electrolyte layer comprises water and a water-retaining component, configured to deliver water to the positive active material of the positive active material layer during operation of the electrochemical cell, and
        wherein an amount of water in the electrochemical cell is 5% to 10% of a total weight of the electrochemical cell.

2. The method of claim 1, wherein the electrolyte layer is printed directly onto the positive active material layer or the negative active material layer.

3. The method of claim 1, wherein the water-retaining component comprises one or more crystal hydrates.

4. The method of claim 1, wherein the water-retaining component comprises one or more water-retaining polymers.

5. The method of claim 1, wherein the water-retaining component comprises one or more porous inorganic compounds.

6. The method of claim 3, wherein the one or more crystal hydrates are selected from the group consisting of $MgSO_4$, $MgCl_2$, $Na_2HPO_4$, $CuSO_4$, $CaCl_2$, $KAl(SO_4)_2$, and $Mg(NO_3)_2$.

7. The method of claim 4, wherein the one or more water-retaining polymers are selected from the group consisting of sodium polyacrylate, potassium polyacrylate, carboxymethyl cellulose, polyvinyl alcohol, ammonium polyacrylate, and a cellulose derivative.

8. The method of claim 4, wherein the one or more water-retaining polymers comprise xanthan or methylcellulose.

9. The method of claim 1, wherein the water-retaining component comprises one or more inorganic compounds selected from the group consisting of fumed silica and precipitated silica.

10. The method of claim 1, wherein the electrolyte layer comprising water in an amount of 30% to 70% of a total weight of the electrolyte layer.

11. The method of claim 1, wherein the electrolyte layer provides an ionic conductivity above 50 mS/cm between the positive active material layer and the negative active material layer.

12. The method of claim 1, wherein an amount the positive active material is 80% to 95% of a total weight of the positive active material layer and also is 5% to 10% of a total weight of the electrochemical cell.

13. The method of claim 1, wherein an amount of the positive active material and an amount of the negative active material is less than 50% of the total weight of the electrochemical cell.

14. The method of claim 1, wherein the amount of water in the electrochemical cell is from 6% to 8% by weight of the total weight of the electrochemical cell.

15. The method of claim 1, wherein more than 50% by weight of the water in the electrochemical cell is present in the electrolyte layer.

16. The method of claim 1, wherein the electrolyte layer comprises silica.

17. The method of claim 16, wherein the silica has a concentration of between 2% and 10% by weight in the electrolyte layer.

18. The method of claim 1, wherein a portion of the water, which is introduced while rehydrating the water-retaining component by exposing the positive active material layer to the humid environment, is lost during subsequent operations of the method of forming the electrochemical cell.

19. The method of claim 1, wherein the positive active material is selected from the group consisting of manganese oxide ($MnO_2$), silver oxide ($Ag_2O$), nickel oxide ($NiO_2$), nickel oxide hydroxide (NiOOH), vanadium oxide ($V_2O_5$), ferric phosphate ($FePO_4$), cobalt oxide ($COO_2$), lead oxide (PbO), and chromium oxide ($Cr_2O_3$).

20. The method of claim 1, wherein one or both of the positive active material layer or the electrolyte layer comprise carboxymethyl cellulose (CMC).

* * * * *